(12) United States Patent
Matsen et al.

(10) Patent No.: US 11,576,235 B2
(45) Date of Patent: Feb. 7, 2023

(54) INDUCTION COOKWARE WITH BI-METALLIC SMART SUSCEPTOR

(71) Applicant: The Boeing Company, Chicago, IL (US)

(72) Inventors: Marc R. Matsen, Seattle, WA (US); Landon K. Henson, Snoqualmie, WA (US)

(73) Assignee: THE BOEING COMPANY, Chicago, IL (US)

( * ) Notice: Subject to any disclaimer, the term of this patent is extended or adjusted under 35 U.S.C. 154(b) by 700 days.

(21) Appl. No.: 16/442,415

(22) Filed: Jun. 14, 2019

(65) Prior Publication Data

US 2020/0396805 A1 Dec. 17, 2020

(51) Int. Cl.
*H05B 6/12* (2006.01)
*H05B 6/06* (2006.01)
(Continued)

(52) U.S. Cl.
CPC .......... *H05B 6/1245* (2013.01); *A47J 27/002* (2013.01); *A47J 36/02* (2013.01);
(Continued)

(58) Field of Classification Search
CPC .......... A47J 27/002; A47J 36/02; A47J 27/00; A47J 36/04; A47J 41/00; A47J 27/21; A47J 31/06; A47J 36/24; H05B 2213/07; H05B 6/10; H05B 6/40; H05B 6/44; H05B 6/64; H05B 3/00; H05B 1/02; H05B 2206/02; H05B 2206/023; H05B 6/062; H05B 6/1209; H05B 6/1245; B64F 5/10; B29C 35/08; B29C 70/44; B05C 13/00; A61L 9/02; A61L 9/03; C22C 21/00;
(Continued)

(56) References Cited

U.S. PATENT DOCUMENTS

| | | | |
|---|---|---|---|
| 3,979,572 A * | 9/1976 | Ito ............................. | A47J 36/02 219/621 |
| 5,064,055 A * | 11/1991 | Bessenbach ............ | A47J 36/02 220/626 |

(Continued)

FOREIGN PATENT DOCUMENTS

| | | | |
|---|---|---|---|
| CN | 108338692 A | * | 7/2018 |
| JP | 2007130310 A | * | 5/2007 |

*Primary Examiner* — Dana Ross
*Assistant Examiner* — Joseph W Iskra
(74) *Attorney, Agent, or Firm* — MH2 Technology Law Group LLP (57) ABSTRACT

Cookware, and an induction cooking system including the cookware, include a container, a base layer, and a susceptor layer. The container and the base layer are non-magnetic at room temperature, while the susceptor layer is magnetic at room temperature and has a Curie temperature at which the susceptor layer becomes non-magnetic. During heating of a material within the container, the base layer functions as a passive heat exchange to transfer heat across the susceptor layer. Further, during the heating, the base layer conducts an electric current when the susceptor layer approaches a leveling temperature and/or the Curie temperature of the susceptor layer, thereby decreasing an amount of heat produced and resulting in a more even heating of the material.

22 Claims, 3 Drawing Sheets

(51) Int. Cl.
*A47J 27/00* (2006.01)
*A47J 36/02* (2006.01)

(52) U.S. Cl.
CPC ......... *H05B 6/062* (2013.01); *H05B 2206/02* (2013.01); *H05B 2213/07* (2013.01)

(58) Field of Classification Search
CPC ......... C22C 21/08; C22C 38/00; C22C 38/02; C22C 38/04; C22C 38/18; C22C 38/44; C22C 38/58; B05D 3/02; H01F 41/00; A01M 1/02; A01M 5/04; A01M 7/00; A01M 99/00; A01M 5/02; A01M 3/00; A01M 1/22; A01M 1/20; A01M 1/14; A01M 1/06; A01H 1/02; B64D 1/18; B64D 47/08; B64C 39/02; H04N 7/18; H04N 5/225; G06T 7/00; G06T 7/62; G06T 7/90; G06T 3/40; G06K 9/00; G06K 9/62; B05B 11/04; B05B 11/00; B05B 9/00; B05B 9/08; B05B 12/12; G01J 5/04; G01J 5/02; B60N 3/10; F25B 21/00; F24C 7/00; F24C 7/08; G05D 23/19; B65D 81/34
USPC ........................................................ 219/620
See application file for complete search history.

(56) References Cited

U.S. PATENT DOCUMENTS

| | | |
|---|---|---|
| 9,510,398 B1 | 11/2016 | Miller et al. |
| 9,635,715 B1 | 4/2017 | Miller et al. |
| 2016/0262216 A1 | 9/2016 | Kestner et al. |

\* cited by examiner

INDUCTION COOKWARE WITH BI-METALLIC SMART SUSCEPTOR

TECHNICAL FIELD

The present teachings relate to the field of heat processing and, more particularly, to induction heating.

BACKGROUND

Induction heating systems employ an electromagnetic field to generate heat. In particular, induction heating systems typically employ an induction source such as an induction coil to emit a variable electromagnetic field onto a container, pot, pan, vessel, cookware, and/or other heating or cooking apparatus (hereinafter, collectively, container). The container includes a magnetic susceptor, for example, a ferrous susceptor. The variable electromagnetic field induces an electromagnetic field in the container, which causes eddy currents within the container that results in heating of the susceptor. The container provides heat via thermal conduction to contents positioned within the container.

Containers used with induction cookware are typically composed of ferrous materials (e.g., iron, steel, etc.) having a relatively high electrical conductivity. These materials continue to heat until either the cookware reaches thermal equilibrium (which typically far exceeds a desirable cooking temperature) or the induction coil is powered off. Thus, known induction heating systems typically require careful monitoring of the material being heated and significant interaction with induction cooktop controls by an operator, complex control systems and/or circuits, and/or continuous mixing to prevent or reduce instances of overheating, under heating, and/or uneven heating of the contents being heated within the container.

Further, containers composed of non-ferrous materials are not used with induction heating apparatus because non-ferromagnetic materials do not magnetically couple well to the electromagnetic field generated by the induction coil. As a result, metallic, non-ferromagnetic materials such as, for example, copper and aluminum are not employed with induction heating applications (e.g., induction cooking) because they do not effectively heat under the influence of an induction coil.

An improved container, induction system, and method for heating and/or cooking would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a cookware for use with an induction coil includes a container configured to receive a material to be heated and a bi-metallic assembly over a surface of the container and in thermal communication with the container. Further, the bi-metallic assembly includes a susceptor layer and a base layer positioned adjacent to the susceptor layer. The susceptor layer is magnetic at room temperature and has a Curie temperature at which the susceptor layer is non-magnetic, the container is non-magnetic at the room temperature, and the base layer is non-magnetic at the room temperature, an electrical conductor, a thermal conductor, and in thermal communication with the susceptor layer. In some implementations, the susceptor layer can include nickel, iron, cobalt, or combinations thereof, the base layer can include copper, bronze, non-magnetic copper-nickel, aluminum, or combinations thereof, and the container includes glass, borosilicate glass, ceramic, non-magnetic metal, or combinations thereof. The susceptor layer can have a thickness of from 0.065 micrometers (µm) to 150 µm, and the base layer can have a thickness of from 0.065 µm to 150 µm. In some implementations, the Curie temperature of the susceptor layer can be from 30° C. to 500° C. Further, the susceptor layer can be a metal alloy having from 30 weight percent (wt. %) to 36 wt. % nickel and from 63 wt. % to 70 wt. % iron, and the base layer can include at least 65 wt. % copper. Optionally, the base layer can be positioned between the susceptor layer and the container and, in other implementations, the susceptor layer can be positioned between the base layer and the container. Further optionally, the base layer can have an electrical conductivity of from 1E7 Siemens per meter (S/m) to 6E7 S/m and a thermal conductivity of from 200 watts per meter-kelvin (W/m·K) to 400 W/m·K.

In another implementation, a cookware for use with an induction coil includes a container configured to receive a material to be heated, wherein the container includes a susceptor material and a base layer positioned adjacent to the container. Further, the container is magnetic at a room temperature and has a Curie temperature at which the container is non-magnetic, and the base layer is non-magnetic at the room temperature, an electrical conductor, a thermal conductor, and in thermal communication with the container.

In another implementation, an induction cooking system includes a cooktop having an induction coil configured to generate an electromagnetic field and a cookware, where the cookware includes a container configured to receive a material to be heated and a bi-metallic assembly over a surface of the container and in thermal communication with the container. Further, the bi-metallic assembly includes a susceptor layer and a base layer positioned adjacent to the susceptor layer, the susceptor layer is magnetic at a room temperature and has a Curie temperature at which the susceptor layer is non-magnetic, the container is non-magnetic at the room temperature, and the base layer is non-magnetic at the room temperature, an electrical conductor, a thermal conductor, and in thermal communication with the susceptor layer.

Optionally, the susceptor layer can include nickel, iron, cobalt, or combinations thereof, the base layer can include copper, bronze, non-magnetic copper-nickel, aluminum, or combinations thereof, and the container can include glass, borosilicate glass, ceramic, non-magnetic metal, or combinations thereof. Further optionally, the susceptor layer can have a thickness of from 0.065 µm to 150 µm, and the base layer can have a thickness of from 0.065 µm to 150 µm. The Curie temperature of the susceptor layer can be from 100° C. to 500° C.

In some implementations, the susceptor layer can be a metal alloy including from 30 wt. % to 36 wt. % nickel and from 63 wt. % to 70 wt. % iron, and the base layer can include at least 65 wt. % copper.

In another implementation, a method for forming a cookware for use with an induction coil includes forming a bi-metallic assembly including a susceptor layer and a base layer over a surface of a container, wherein the container is configured to receive a material to be heated, the susceptor layer and the base layer are in thermal communication with the container, the susceptor layer is magnetic at a room temperature and has a Curie temperature at which the susceptor layer is non-magnetic, the base layer is non-magnetic at the room temperature, an electrical conductor, and a thermal conductor, and the container is non-magnetic at the room temperature.

Optionally, the method can further include coating the surface of the container with the susceptor layer, and coating the susceptor layer with the base layer, wherein the susceptor layer can be positioned between the container and the base layer. Some implementations can also include coating the surface of the container with the base layer, and coating the base layer with the susceptor layer, wherein the base layer can be positioned between the container and the susceptor layer. The forming of the bi-metallic assembly over the surface of the container can include forming the susceptor layer to have a thickness of from 0.065 μm to 150 μm, and forming the base layer to have a thickness of from 0.065 μm to 150 μm. The Curie temperature of the susceptor layer may be from 30° C. to 500° C.

In some implementations, the susceptor layer can include nickel, iron, cobalt, or combinations thereof, the base layer can include copper, bronze, non-magnetic copper-nickel, or combinations thereof, and the container can include glass, borosilicate glass, ceramic, non-magnetic metal, or combinations thereof. Optionally, the method can further include applying a nonstick coating to the container.

In another implementation, a method for cooking includes placing a material to be heated onto a cookware, the cookware including a container configured to receive the material to be heated and a bi-metallic assembly positioned over a surface of the container and in thermal communication with the container, where the bi-metallic assembly includes a base layer and a susceptor layer, the susceptor layer is magnetic at a room temperature and has a Curie temperature at which the susceptor layer is non-magnetic, the container is non-magnetic at the room temperature, and the base layer is non-magnetic at the room temperature, an electrical conductor, a thermal conductor, and in thermal communication with the susceptor layer. The method further includes placing the cookware in proximity to an electromagnetic field, flowing, with the cookware in proximity to the electromagnetic field, an electric current through the susceptor layer and heating the susceptor layer toward a leveling temperature of the susceptor layer, transferring a flow of the electric current from the susceptor layer to the base layer thereby decreasing further heating of at least a portion of the susceptor layer and the container, and removing the material to be heated from the cookware.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

As discussed above, when placed into an electromagnetic field (e.g., a magnetic flux field) generated, for example, by a powered induction coil, a susceptor begins to inductively heat until the susceptor reaches thermal equilibrium or power is removed from the induction coil. When used as cookware, the temperature at which the susceptor reaches thermal equilibrium greatly exceeds a desired cooking temperature. Thus known induction heating systems typically require careful monitoring of the material being heated and significant interaction with induction cooktop controls by an operator, complex control systems and/or circuits, and/or continuous mixing to prevent or reduce instances of overheating, under heating, and/or uneven heating of the contents being heated within the container.

While the present teachings are described herein with reference to preparing food during a cooking process, it will be appreciated that the described structures and processes apply to heating other structures or components for other purposes, for example, heating of a material (e.g., without limitation, thermoplastics, thermosets, adhesives, etc.) during manufacture, measurement, melting, curing, etc.

A susceptor is magnetic at room temperature (i.e., ambient temperature which, for purposes of the present disclosure, is from about 68° F. to 74° F.) and becomes increasingly non-magnetic as it heats under the influence of an electromagnetic field. The susceptor continues heats until it reaches (or approaches) a Curie temperature of the susceptor, at which point the susceptor becomes non-magnetic. Once the susceptor becomes non-magnetic, the electromagnetic field has only a minimal heating influence on the susceptor and further heating is greatly reduced or stops until the temperature of the susceptor decreases to below the Curie temperature. Once the temperature of the susceptor decreases to below the Curie temperature, the susceptor becomes magnetic again and begins to heat again under the influence of the electromagnetic field. Practically speaking, due to heating dynamics, the temperature of the susceptor typically reaches thermal equilibrium within a few degrees below the Curie temperature, for example, from 5° to 25° below the Curie temperature. The temperature at which the susceptor reaches thermal equilibrium is referred to herein as the "leveling temperature." In most settings, the leveling temperature will be below the Curie temperature, but in other settings the leveling temperature can equal or exceed the Curie temperature. A "smart susceptor" is a susceptor that is designed to have a Curie temperature or a leveling temperature that is particularly selected for the anticipated use of the susceptor so that heating of the susceptor significantly slows or levels off at or very near a desired temperature even when continuously exposed to an electromagnetic field.

When cooking, reaching and maintaining an optimum or near-optimum cooking temperature over an entire heating surface of a container such as a pan, pot, etc., is desired. Induction cookware manufactured from ferromagnetic materials can have a Curie temperature well above the burning point of most foods. Further, current induction cookware can have a significant temperature variation across the surface of the cookware as different points across the surface reach the leveling temperature at different times. Therefore, currently, significant operator interaction with the induction cooktop controls is required to approximate this state, to prevent overheating, and to achieve even cooking.

An implementation of the present teachings can result in a more even heating across the heating surface of induction cookware. Further, an implementation can include cookware that has a lower Curie temperature that is more compatible with food preparation than some other conventional cookware. Further, the cookware as described herein is operable on conventional induction cooktops having an induction coil that generates an electromagnetic field, and thus does not require an expensive replacement of a conventional induction cooktop.

Figure 1:
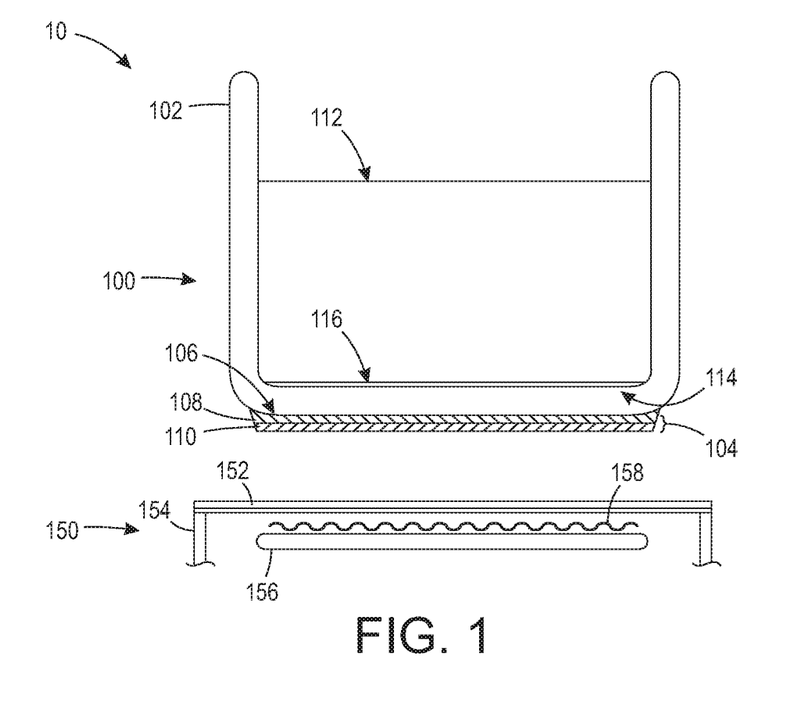
FIG. 1 is a cross section of an induction cooking system including a cookware and an induction cooktop in accordance with an implementation of the present teachings.

FIG. 1 depicts an induction cooking system 10 in accordance with an implementation of the present teachings. The induction cooking system 10 of FIG. 1 includes a cookware 100 and an induction cooktop 150.

The cookware 100 for use with the induction cooktop 150 includes a container 102 and a bi-metallic assembly 104 positioned on and/or over an outside surface 106 of the container 102. The bi-metallic assembly 104 can include a base layer 108 and a susceptor layer 110. It will be understood that the bi-metallic assembly 104 can include additional layers, depending on the design.

The container 102 can be formed from any material that is non-magnetic at room temperature through the Curie temperature of the susceptor layer 110. The container 102 can be or include, for example, non-ferrous materials such as glass, borosilicate glass, ceramic, non-magnetic metal, or combinations thereof, or another suitable material. The container 102 can have any desired shape and thickness depending, for example, on the designed use of the container 102. Generally, the container 102 should be sufficiently thin and/or thermally conductive to allow heat generated within the susceptor 110 that is positioned over the outside surface 106 to pass through the container 102 and into a material 112 (e.g., a foodstuff) to be heated.

The base layer 108 can be formed from any material that is non-magnetic at room temperature through the Curie temperature of the susceptor layer 110, an electrical conductor, and a thermal conductor. The base layer 108 can be or include, for example, copper, bronze, brass, non-magnetic copper-nickel (e.g., nonmagnetic alloys of Monel), aluminum, or combinations thereof. Suitable thicknesses for the base layer 108 will depend on the design of the system, for example, on the exciting frequency of the induction coil 156 (described in more detail below). For example, at an exciting frequency of 24 kilohertz (kHz) to 50 kHz, the base layer 108 can have a thickness of from about 0.065 micrometers (µm) to about 150 µm, for example from about 97.5 µm to about 150 µm, or from about 0.065 µm to about 100 µm. A base layer 108 that is too thin would provide excessively high electrical resistance and a poor current path once the susceptor layer 110 reaches the leveling temperature and/or the Curie temperature. Furthermore, a base layer 108 that is too thin would provide a poor thermal path across the surface 106 of the container 102, resulting in a higher variation in temperature across the surface 106 compared to a base layer 108 having a proper thickness. A base layer 108 that is overly thick would excessively attenuate the electric field and provide too large of a thermal mass, thereby decreasing the heating effect of the susceptor layer 110 at temperatures below the leveling temperature.

The susceptor layer 110 can be formed from any material that is magnetic at room temperature and becomes non-magnetic at the Curie temperature of the susceptor layer 110. The susceptor layer 110 can be or include, for example, nickel, iron, cobalt, or combinations thereof. Suitable thicknesses for the susceptor layer 110 will depend on the design of the system, for example, on the exciting frequency of the induction coil 156 (described in more detail below). Further, the susceptor layer 110 can have a thickness of from about 0.065 µm to about 150 µm, for example from about 97.5 µm to about 150 µm, or from about 0.065 µm to about 100 µm. A susceptor layer 110 that is too thin will not heat inductively due to insufficient or absent eddy currents, while a susceptor layer 110 that is too thick will require an excessively long heating time due to the large thermal mass of the susceptor layer.

The induction cooktop 150 can include a glass top 152, a housing 154, and an induction coil 156 encased within the housing 154. The induction coil 156, when sufficiently powered, generates and emits an electromagnetic field 158 that penetrates the glass top 152 and extends at least to the susceptor layer 110 with the cookware 100 placed onto the glass top 152. In some implementations, the induction coil 156 is powered using a high frequency (e.g., 24 kilohertz, kHz) alternating current. Induction coils and induction cooktops are well known in the art.

During operation of the induction cooktop 150, the cookware 100 is placed onto and/or in proximity to the glass top 152. The induction coil 156 is powered such that it emits the electromagnetic field 158, where the electromagnetic field 158 penetrates the susceptor layer 110 and the base layer 108. While the susceptor layer 110 is at a temperature below the Curie temperature (i.e., while the susceptor layer 110 is magnetic), the susceptor layer 110 has a relatively high magnetic permeability and a relatively small "skin depth" through which the electrical current flows, resulting in the susceptor layer 110 having a relatively high electrical resistance. Because of the small skin depth, the resulting relatively high electrical resistance causes the susceptor layer 110 to heat in the presence of the electromagnetic field 158. As the temperature of the susceptor layer 110 approaches the leveling temperature and/or the Curie temperature, the susceptor layer 110 becomes less magnetic, the magnetic permeability decreases, the skin depth through which the electrical current flows increases resulting in a decrease of the electrical resistance of the susceptor layer 110, and heating significantly decreases when the susceptor layer 110 temperature reaches the leveling temperature and/or the Curie temperature. As discussed above, the susceptor layer 110 more often reaches thermal equilibrium at the leveling temperature which is typically below the Curie temperature.

During the heating of the susceptor layer 110, the inclusion of the base layer 108 has at least two main effects on the heating of the cookware 100, a thermal effect and an electrical effect.

With regard to the thermal effect, the base layer 108 can function as a passive heat exchanger to transfer thermal energy across the susceptor layer 110 and across the outside surface 106 of the container 102. In this capacity, the base layer 108 provides passive regulation of the temperature across the susceptor layer 110 and the outside surface 106 of the container 102. This decreases the range of temperatures across the susceptor layer 110 and across the outside surface 106 of the container, and allows for more precise thermal control of heating of the foodstuff 112 within the container 102, compared to conventional cookware.

With regard to electrical operation, the base layer 108 can provide a current path after one or more regions or portions of the susceptor layer 110 become low-magnetic when approaching the leveling temperature and/or non-magnetic after reaching the Curie temperature. At room temperature, the skin depth of the susceptor layer 110 is small and, as a result, the electrical resistance of the susceptor layer 110 is high. When placed into an electromagnetic field 158 generated by the induction coil 156, the susceptor layer 110 begins to inductively heat and the increasing temperature causes the magnetic permeability of the susceptor layer 110 to decrease. The decrease in magnetic permeability causes the skin depth of the susceptor layer 110 to increase, which results in the attenuation of the electrical resistance of the susceptor layer 110 which, in turn, reduces the heating effect. With increased heating toward the Curie temperature, the susceptor layer 110 becomes increasingly nonmagnetic. Once the susceptor layer 110 becomes sufficiently nonmagnetic, the base layer 108 becomes the preferred current path due to the low resistivity of the base layer 108. Once the susceptor layer 110 begins to cool, the susceptor layer 110 becomes increasingly magnetic, the current flow through the susceptor layer 110 increases, and the susceptor layer 110 begins to heat until again reaching the leveling temperature and/or the Curie temperature. As portions of the susceptor layer 110 approach the Curie temperature and the susceptor layer 110 becomes less magnetic, the current resulting from the electromagnetic field 158 generated by the induction coil 156 begins to flow again through the base layer 108. At relatively higher temperatures around the Curie temperature and/or the leveling temperature of the susceptor layer 110, the electrically conductive base layer 108 greatly decreases the amount of heat generated within the cookware, thereby improving the thermal performance of the cookware 100. This, in turn, results in more even heating of the foodstuff 112 compared to conventional induction cookware and induction cooking systems. Furthermore, the base layer 108 evens the temperature across the outside surface 106 of the cookware 100, which is transferred through the container 102 to an inside surface 114 of the container 102. This reduces the likelihood of overheating the foodstuff 112 and/or a nonstick coating 116 (e.g., a coating including a nonstick polymer including, for example, polytetrafluoroethylene, fluorinated ethylene propylene copolymer, perfluoroalkoxy, a copolymer of ethylene and tetrafluoroethylene, fluoroplastic, combinations thereof, or another nonstick material) applied to, and positioned on, the inside surface 114 of the container 102.

It will be understood that FIG. 1 depicts an example implementation and that a device design can include other features that are not depicted for simplicity, while depicted structures may be removed or modified. For example, as described above, FIG. 1 depicts the base layer 108 positioned between the susceptor layer 110 and the outside surface 106 of the container 102. In another implementation, the susceptor layer may be positioned between the base layer and the outside surface 106 of the container 102, such that the FIG. 1 reference number 108 identifies the susceptor layer while reference number 110 identifies the base layer. Additionally, either the susceptor layer 110 and/or the base layer 108 may be formed as two or more sub-layers. Moreover, it is contemplated that, in some uses, the susceptor layer 110 and the base layer 108 can be provided on the inside surface 114 of the container 102 in either orientation (i.e., the susceptor layer positioned between the container 102 and the base layer, or the base layer positioned between the container 102 and the susceptor layer).

As described above, the base layer 108 is non-magnetic at all operating temperatures (e.g., from room temperature to the Curie temperature of the susceptor layer), electrically conductive, and thermally conductive. In an implementation, the base layer 108 has an electrical conductivity of from about 1E7 Siemens per meter (S/m) to about 6E7 S/m. Furthermore, in an implementation, the base layer 108 has a thermal conductivity of from about 200 watts per meter-kelvin (W/m·K) to about 400 W/m·K. A base layer that is not sufficiently electrically conductive will not sufficiently conduct an electric current as the susceptor layer approaches the Curie temperature, and will generate excessive heat and may overheat the foodstuff 112 within the container. A base layer that is not sufficiently thermally conductive may not provide even heating across the outside surface 106 and the inside surface 114 of the container 102. As discussed above, the base layer is formed from a material that is nonmagnetic at room temperature, for example, the base layer can be or include copper, bronze, brass, non-magnetic copper-nickel (e.g., nonmagnetic alloys of Monel), aluminum, or combinations thereof. In an implementation, the base layer can include at least 65 wt. % copper to about 100 wt. % copper. In some implementations, the base layer can include zinc, for example, up to about 35 wt. % zinc, and tin, for example, up to about 12 wt. % tin.

The container 102 can have an electrical conductivity and a thermal conductivity that are less than the electrical conductivity of the base layer 108. Generally, the container 102 will make up the greatest mass of the cookware 100, and thus may be manufactured from a material that is less expensive than the base layer 108 and the susceptor layer 110. Forming the container 102 from a material different than the base layer 108 and the susceptor layer 110 thereby can reduce the cost of the cookware while maintaining the heating/thermal control advantages provided by the susceptor layer 110 and the base layer 108.

In an implementation of the present teachings, the susceptor layer 110 can be manufactured from various compositions to provide different Curie temperatures to provide different maximum or upper limit temperatures based on an intended use of the cookware. For example, a susceptor layer 110 formed from an alloy containing 31 weight percent (wt. %) nickel and 63 wt. % iron provides a Curie temperature of approximately 212° F. for use in heating a liquid (e.g., boiling water). In contrast, a susceptor layer 110 formed from an alloy of 30 wt. % nickel and 70 wt. % iron provides a Curie temperature of approximately 150° F. for melting, for example, chocolate. Furthermore, a susceptor layer 110 formed from an alloy of 36 wt. % nickel and 64 wt. % iron may provide a Curie temperature of approximately 350° F. Thus, for the implementations discussed above, the susceptor can be or include a metal alloy having from about 30 wt. % to about 36 wt. % nickel and from about 63 wt. % to about 70 wt. % iron.

The cookware can be designed to have a lower Curie temperature and a thermal mass for specialized applications such as making candy, melting chocolate, etc. For example, the susceptor can have a Curie temperature or leveling temperature of from 31° C. to 32° C. to melt chocolate crystals having a Type I to Type IV chocolate crystal structure during the formation of chocolate having a Type IV chocolate crystal structure. In an implementation, the Curie temperature of the susceptor layer 110 can be from about 30° C. (about 86° C.) to about 100° C. (about 212° C.), or from about 30° C. (about 86° F.) to about 500° C. (about 932° F.), or from about 100° C. to 500° C., or higher, depending on the intended use of the cookware by forming alloys (e.g., ferromagnetic alloys) having different weight percentages of different metals (for example, increasing iron content to increase the Curie temperature).

The base layer 108 can be manufactured from a material that has a lower electrical resistance or resistivity than the susceptor layer 110. In other words, the material from which the susceptor layer 110 is manufactured has a higher electrical resistance or resistivity than the base layer 108. For example, the nickel-iron alloy Invar (i.e., 64FeNi, FeNi36), a susceptor material, has a resistivity of 485 ohms per mil-foot ($\Omega$/mil-ft), while copper has a resistivity of 10.2 $\Omega$/mil-ft. In general, a resistivity of a susceptor material used for the susceptor layer 110 will be at least 10 times, or at least 20 times, the resistivity of a material used for the base layer 108.

Figure 2:
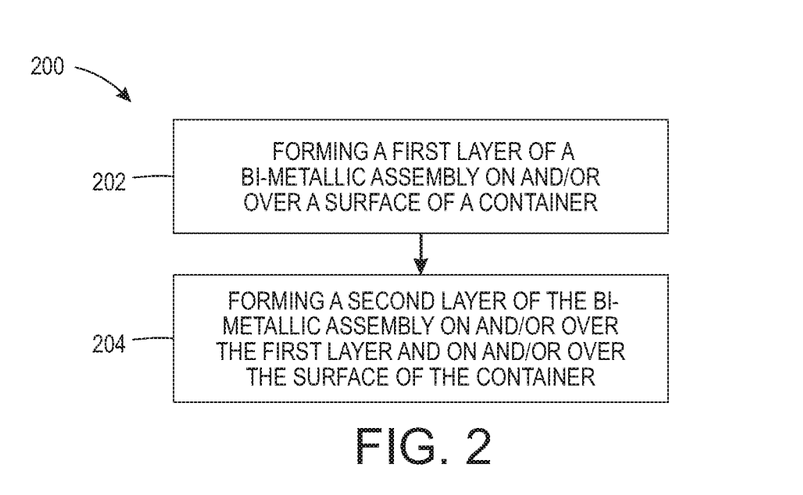
FIG. 2 is a flow chart of a method for forming a cookware in accordance with an implementation of the present teachings.

FIG. 2 depicts a method 200 for forming a cookware for use with an induction coil. The method 200 may proceed by operation or use of one or more of the structures depicted in FIG. 1 described above, and thus is described with reference to FIG. 1; however, it will be appreciated that the method 200 is not limited to any particular structure or use unless expressly stated herein. The method 200 may be performed before, during, or after other processes, for example, as an assembly sub-process prior. It will be appreciated that while the process is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while other depicted acts or events may be removed or modified.

At 202, a first layer 108 of a bi-metallic assembly 104 is formed on and/or over a surface (i.e., an outside surface 106 or an inside surface 114) of a container 102. At 204, a second layer 110 of the bi-metallic assembly 104 is formed on and/or over the first layer 108, and on and/or over the surface of the container 102. In one implementation, the first layer 108 will be the base layer 108 and the second layer 110 will be the susceptor layer, such that the base layer 108 is positioned between the container 102 and the susceptor layer 110. In another implementation, the order of the base layer and the susceptor layer will be reversed such that the susceptor layer is positioned between the base layer and the susceptor layer. The first layer 108 may be formed on (i.e., to physically contact, at least in part) the surface of the container 102 and the second layer 110 may be formed on or over the first layer 108 and over the surface of the container 102. One or both of the first layer 108 and the second layer 110 can be applied using a spray coating process. In another implementation, or one or both of the first layer 108 and the second layer 110 can be pre-formed using, for example, a molding process, a plating process, an etching process, etc., and then adhered, either separately or together, to the surface 106 of the container 102 using a suitable adhesive (not individually depicted for simplicity). The method for forming the cookware 100 can include other method acts, such as forming a nonstick coating 116 on the container 102, for example, by spray coating the nonstick coating 116 onto the inside surface 114 of the container 102.

Figure 3:
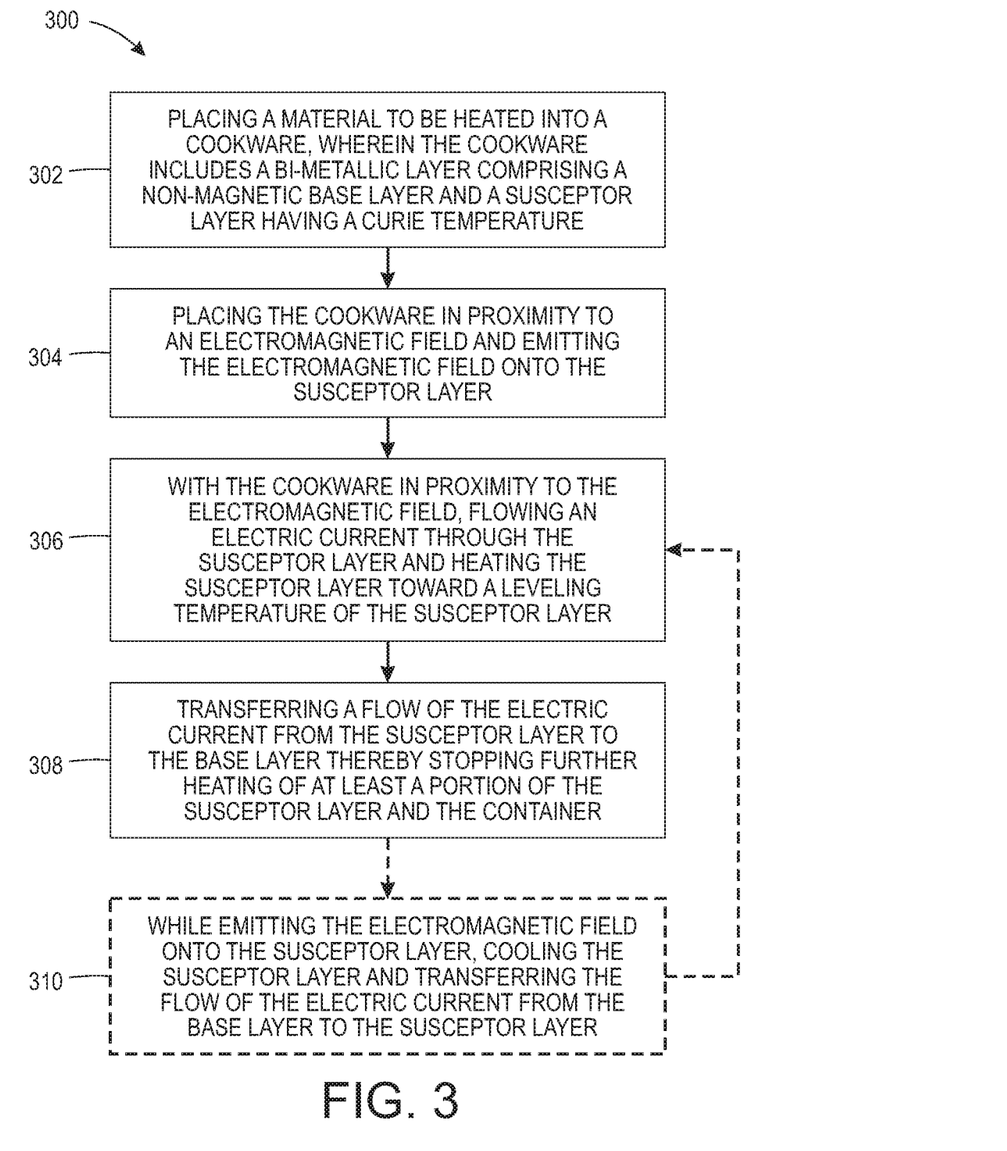
FIG. 3 is a flow chart depicting a method for heating a material using a cookware in accordance with an implementation of the present teachings.

FIG. 3 depicts a method for cooking. In one aspect, the method for cooking can include cooking a foodstuff. In another aspect, the method for cooking can include heating a non-foodstuff, for example, a thermoset, a thermoplastic, an adhesive, or another non-foodstuff. The method 300 may proceed by operation or use of one or more of the structures depicted in the figures described above, and thus is described with reference to FIG. 1; however, it will be appreciated that the method 300 is not limited to any particular structure or use unless expressly stated herein. It will be appreciated that while the process is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while other depicted acts or events may be removed or modified.

The method 300 for cooking can begin by placing a material 112 to be heated onto a cookware 100 as at 302. As described above with reference to FIG. 1, the cookware can include a bi-metallic assembly 104 positioned over a surface (e.g., an outside surface 106 or an inside surface 114) of the container 102 and in thermal communication with the container 102. The bi-metallic assembly 104 can include a base layer 108 and a susceptor layer 110 as described above. The cookware 100 is placed in proximity to an electromagnetic field 158 generated, for example, by a powered induction coil 156 that may be part of an induction cooktop 150. When the susceptor layer 110 is in proximity of the powered induction coil 156, the electromagnetic field 158 is emitted from the induction coil 156 onto the susceptor layer 110 as at 304. Emitting the electromagnetic field 158 onto the susceptor layer 110 causes an electric current to flow through the susceptor layer 110 to heat the susceptor layer 110 toward a leveling temperature of the susceptor layer 110 as at 306. As the susceptor layer 110 approaches the leveling temperature or a Curie temperature of the susceptor layer 110, a flow of the electric current transfers from the susceptor layer 110 to the base layer 108 as at 308, thereby significantly slowing or stopping further heating of the at least a portion of the susceptor layer 110 and the container 102. Optionally, while emitting the electromagnetic field 158 onto the susceptor layer 110, the susceptor layer 110 cools which causes the electric current to transfer from the base layer 108 back to the susceptor layer 110 as at 310, such that the susceptor layer starts to heat toward the leveling temperature again, as at 306. Once the material 112 to be heated is sufficiently heated, power to the induction coil 156 is removed.

Referring back to FIG. 1, in some implementations, the container 102 itself may be formed from, and thereby provide, the susceptor layer. In these implementations, the structure of FIG. 1 would be similar, except the susceptor layer 110 would be omitted, as the container 102 would provide the susceptor layer. As depicted, the base layer 108 would be formed on and/or over the container 102.

Figure 4:
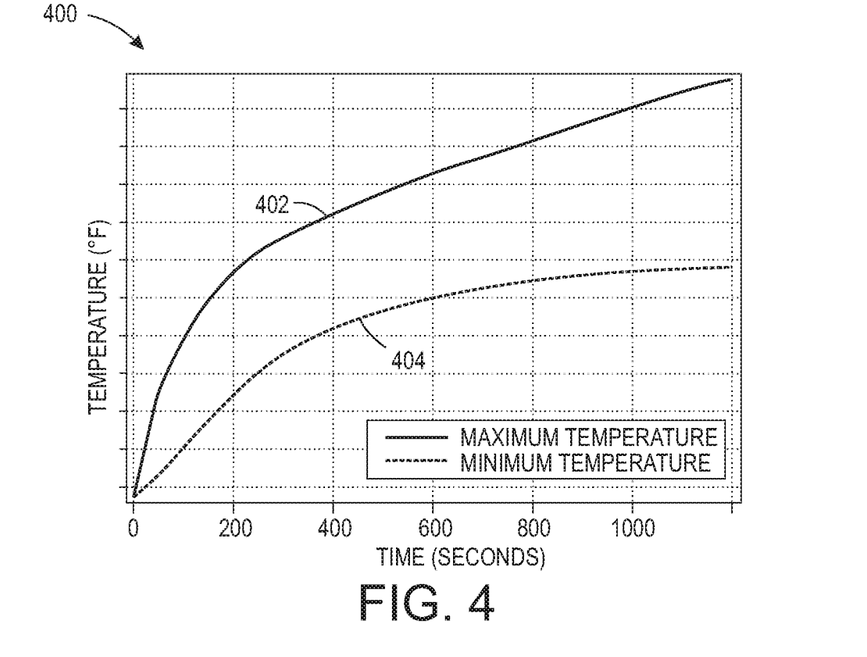
FIG. 4 is a graph depicting exemplary maximum and minimum temperatures over time across a cooking surface of a conventional cookware.
Figure 5:
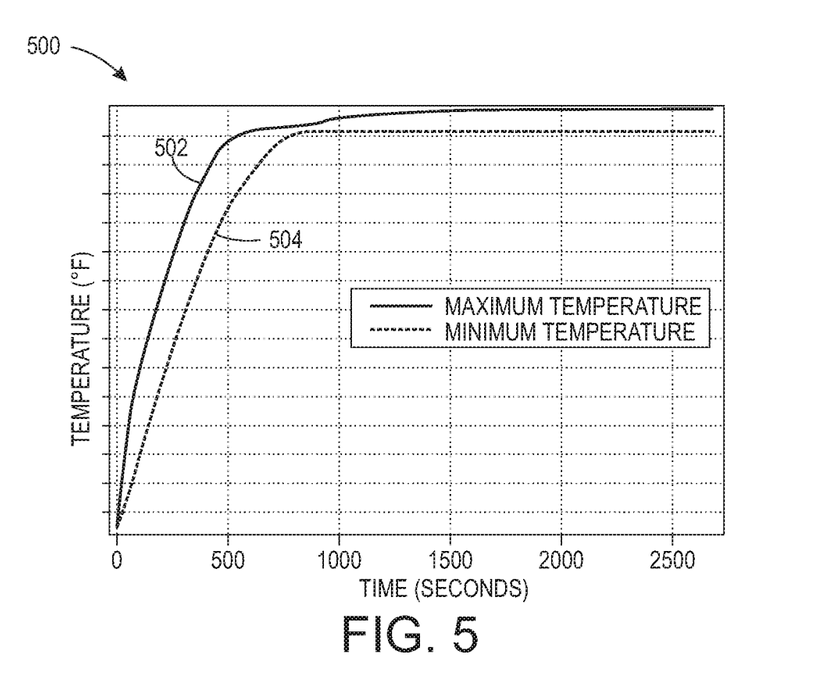
FIG. 5 is a graph depicting exemplary maximum and minimum temperatures over time across a cooking surface of a cookware in accordance with the present teachings.

FIG. 4 is a graph 400 depicting a heat profile across a cooking surface of an induction cookware that does not include a base layer during heating of the cookware by continuous exposure to an electromagnetic field generated by an induction coil. FIG. 4 plots a maximum temperature 402 and a minimum temperature 404 measured over time across the cooking surface of the cookware. In contrast, FIG. 5 is a graph 500 depicting a heat profile across a cooking surface of an induction cookware that includes a base layer during heating of the cookware by continuous exposure to an electromagnetic field generated by an induction coil. FIG. 5 plots a maximum temperature 502 and a minimum temperature 504 measured over time across the cooking surface of the cookware. As illustrated, the cookware measured to plot the FIG. 4 graph (herein, the FIG. 4 cookware) has a greater difference between the maximum temperature 402 and the minimum temperature 404 compared to the cookware measured to plot the FIG. 5 graph (herein, the FIG. 5 cookware). Further, the maximum temperature 402 of the FIG. 4 cookware continues to increase after 1200 seconds, while the maximum temperature 502 of the FIG. 5 cookware levels off at about 1000 seconds. The graphs 400, 500 of FIGS. 4 and 5 thus suggest that cookware including a base layer in accordance with the present teachings has a more uniform temperature (i.e., a relatively smaller temperature variation) across a cooking surface compared to cookware without a base layer, which has a relatively greater temperature variation across the cooking surface. Further, cookware including a base layer reaches and maintains a leveling temperature with continued exposure to an electromagnetic field generated by an induction coil while, in contrast, cookware without a base layer continues to increase in temperature with continued exposure to an electromagnetic field generated by an induction coil. Additionally, as described above, the leveling temperature can be selected during design of the cookware based on the metallic composition of the susceptor layer.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A cookware for use with an induction coil, the cookware comprising:
   a container configured to receive a material to be heated; and
   a bi-metallic assembly over a surface of the container and in thermal communication with the container, wherein:
   the bi-metallic assembly comprises a susceptor layer and a base layer positioned adjacent to the susceptor layer;
      the susceptor layer is magnetic at room temperature and has a Curie temperature at which the susceptor layer is non-magnetic;
   the container is non-magnetic at the room temperature; and
   the base layer is non-magnetic at the room temperature, an electrical conductor, a thermal conductor, in thermal communication with the susceptor layer, and comprises at least 65 weight percent (wt. %) copper.

2. The cookware of claim 1, wherein:
   the susceptor layer comprises nickel, iron, cobalt, or combinations thereof;
   the base layer comprises copper, bronze, non-magnetic copper-nickel, aluminum, or combinations thereof; and
   the container comprises glass, borosilicate glass, ceramic, non-magnetic metal, or combinations thereof.

3. The cookware of claim 1, wherein:
the susceptor layer has a thickness of from 0.065 micrometers (μm) to 150 μm; and
the base layer has a thickness of from 0.065 μm to 150 μm.

4. The cookware of claim 1, wherein the Curie temperature of the susceptor layer is from 30° C. to 500° C.

5. The cookware of claim 1, wherein:
the susceptor layer is a metal alloy comprising from 30 wt. % to 36 wt. % nickel and from 63 wt. % to 70 wt. % iron.

6. The cookware of claim 1, wherein the base layer is positioned between the susceptor layer and the container.

7. The cookware of claim 1, wherein the susceptor layer is positioned between the base layer and the container.

8. The cookware of claim 1, wherein:
the base layer has an electrical conductivity of from 1E7 Siemens per meter (S/m) to 6E7 S/m and a thermal conductivity of from 200 watts per meter-kelvin (W/m·K) to 400 W/m·K.

9. A cookware for use with an induction coil, the cookware comprising:
a container configured to receive a material to be heated, wherein the container comprises a first material on at least a first portion of the container and a susceptor comprising a susceptor material on another portion of the container, the first material being different than the susceptor material; and
a base layer positioned adjacent to the container, wherein:
the container is magnetic at a room temperature and has a Curie temperature at which the container is non-magnetic; and
the base layer is non-magnetic at the room temperature, an electrical conductor, a thermal conductor, and in thermal communication with the container, wherein the base layer comprises zinc or tin.

10. An induction cooking system comprising:
a cooktop comprising an induction coil configured to generate an electromagnetic field; and
a cookware, comprising:
a container configured to receive a material to be heated; and
a bi-metallic assembly over a surface of the container and in thermal communication with the container, wherein:
the bi-metallic assembly comprises a susceptor layer and a base layer positioned adjacent to the susceptor layer;
the susceptor layer is magnetic at a room temperature and has a Curie temperature at which the susceptor layer is non-magnetic;
the container is non-magnetic at the room temperature; and
the base layer is non-magnetic at the room temperature, an electrical conductor, a thermal conductor, in thermal communication with the susceptor layer, and comprises at least 65 weight percent (wt. %) copper.

11. The induction cooking system of claim 10, wherein:
the susceptor layer comprises nickel, iron, cobalt, or combinations thereof;
the base layer comprises copper, bronze, non-magnetic copper-nickel, aluminum, or combinations thereof; and
the container comprises glass, borosilicate glass, ceramic, non-magnetic metal, or combinations thereof.

12. The induction cooking system of claim 10, wherein:
the susceptor layer has a thickness of from 0.065 micrometers (μm) to 150 μm; and
the base layer has a thickness of from 0.065 μm to 150 μm.

13. The induction cooking system of claim 10, wherein the Curie temperature of the susceptor layer is from 100° C. to 500° C.

14. The induction cooking system of claim 10, wherein:
the susceptor layer is a metal alloy comprising from 30 wt. % to 36 wt. % nickel and from 63 wt. % to 70 wt. % iron.

15. A method for forming a cookware for use with an induction coil, the method comprising:
forming a bi-metallic assembly comprising a susceptor layer and a base layer over a surface of a container, wherein:
the container is configured to receive a material to be heated;
the susceptor layer and the base layer are in thermal communication with the container;
the susceptor layer is magnetic at a room temperature and has a Curie temperature at which the susceptor layer is non-magnetic;
the base layer is non-magnetic at the room temperature, an electrical conductor, a thermal conductor, and comprises at least 65 weight percent (wt. %) copper; and
the container is non-magnetic at the room temperature.

16. The method of claim 15, further comprising:
coating the surface of the container with the susceptor layer; and
coating the susceptor layer with the base layer, wherein the susceptor layer is positioned between the container and the base layer.

17. The method of claim 15, further comprising:
coating the surface of the container with the base layer; and
coating the base layer with the susceptor layer, wherein the base layer is positioned between the container and the susceptor layer.

18. The method of claim 15, wherein the forming of the bi-metallic assembly over the surface of the container comprises:
forming the susceptor layer to have a thickness of from 0.065 micrometers (μm) to 150 μm; and
forming the base layer to have a thickness of from 0.065 μm to 150 μm.

19. The method of claim 15, wherein the Curie temperature of the susceptor layer is from 30° C. to 500° C.

20. The method of claim 15, wherein:
the susceptor layer comprises nickel, iron, cobalt, and combinations thereof;
the base layer comprises copper, bronze, non-magnetic copper-nickel, and combinations thereof; and
the container comprises glass, borosilicate glass, ceramic, non-magnetic metal, or combinations thereof.

21. The method of claim 15, further comprising applying a nonstick coating to the container.

22. A method for cooking, comprising:
placing a material to be heated onto a cookware, the cookware comprising:
a container configured to receive the material to be heated; and
a bi-metallic assembly positioned over a surface of the container and in thermal communication with the container, the bi-metallic assembly comprising a base layer and a susceptor layer, wherein:
the susceptor layer is magnetic at a room temperature and has a Curie temperature at which the susceptor layer is non-magnetic;

the container is non-magnetic at the room temperature; and the base layer is non-magnetic at the room temperature, an electrical conductor, a thermal conductor, in thermal communication with the susceptor layer, and comprises at least 65 weight percent (wt. %) copper;

placing the cookware in proximity to an electromagnetic field;

flowing, with the cookware in proximity to the electromagnetic field, an electric current through the susceptor layer and heating the susceptor layer toward a leveling temperature of the susceptor layer;

transferring a flow of the electric current from the susceptor layer to the base layer thereby decreasing further heating of at least a portion of the susceptor layer and the container; and removing the material to be heated from the cookware.

\* \* \* \* \*